Figure 1:
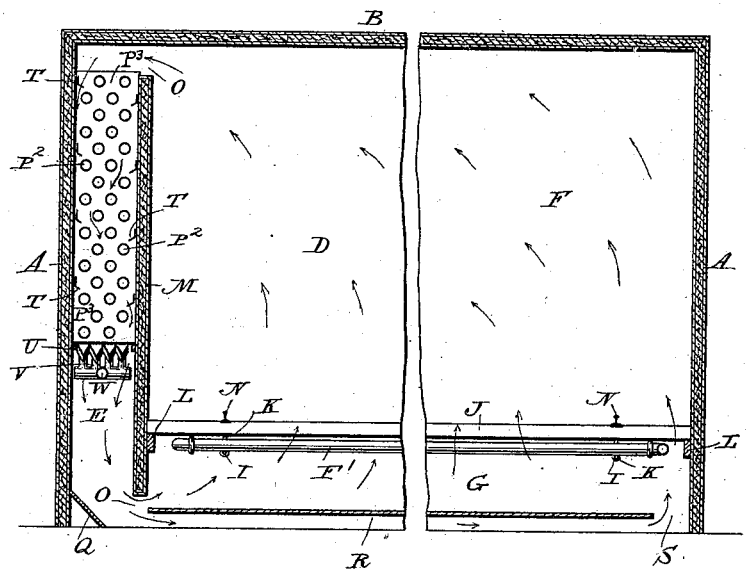

No. 687,305.  
J. F. HANRAHAN.  
DRYING KILN.  
(Application filed May 20, 1901.)

(No Model.)

Patented Nov. 26, 1901.

2 Sheets—Sheet 1.

Witnesses  
Sidney R. Hollingsworth  
Dudley E. Burdine

Inventor:  
Joseph F. Hanrahan,  
by Dodge and Sons,  
Attorneys

United States Patent Office.

JOSEPH FRANCIS HANRAHAN, OF OTTAWA, CANADA.

DRYING-KILN.

SPECIFICATION forming part of Letters Patent No. 687,305, dated November 26, 1901.

Application filed May 20, 1901. Serial No. 61,157. (No model.)

*To all whom it may concern:*

Be it known that I, JOSEPH FRANCIS HANRAHAN, a citizen of Canada, residing at Ottawa, in the county of Carleton, in the Province of Ontario, Canada, have invented certain new and useful Improvements in Drying-Kilns, of which the following is a specification.

My invention relates to improvements in drying-kilns; and the object of the invention is to design a kiln which shall economically, rapidly, evenly, and thoroughly abstract the moisture from wood, leather, grain, fruit, and other materials which it is desirable to dry or desiccate.

It consists, essentially, of an evaporating-chamber, a condensing-chamber having a series of pipes through which cold water, cold brine, anhydrous ammonia-gas, or other refrigerant is caused to circulate, and a distributing-chamber placed beneath the evaporating-chamber. An evaporating-chamber and a distributing-chamber may, if desired, be used on each side of a single condensing-chamber. Each set of evaporating and distributing chambers is separated from the condensing-chamber by a partition extending from near the ceiling of the evaporating-chamber to near the floor of the distributing-chamber and below the plane or level of the heating-pipes. This partition should be well insulated in order that the coils in the condensing-chamber should not absorb heat through the partition. My object in bringing the partition below the line of heating pipes or apparatus and providing a chamber below such apparatus is to secure an even distribution of the air which has been dried in the condensing-chamber. It is of prime importance that this air, which has lost heat as well as moisture, should reach the most distant pipes in the distributing-chamber, as well as those nearest to the condensing-chamber, before it becomes affected by the apparatus utilized to raise its temperature, and thus restore its capacity for absorbing moisture.

I am aware that the combination of a heating and condensing chamber for the purpose of drying is not new. The combination has, however, heretofore utterly failed of its object, owing to the want of proper means for insuring an even distribution of the dried air throughout the whole of the material under treatment. I secure this by means of the distributing-chamber, wherein the dry air is delivered and dispersed evenly below the level of the heating-pipes, and by means of the false floor or horizontal diaphragm located in such chamber and so arranged as to convey any desired proportion of the coolest and driest air to the parts of the evaporating-chamber most remote from the condensing-chamber.

The parts of my invention are constructed and arranged in detail as hereinafter more particularly described.

Figure 2:
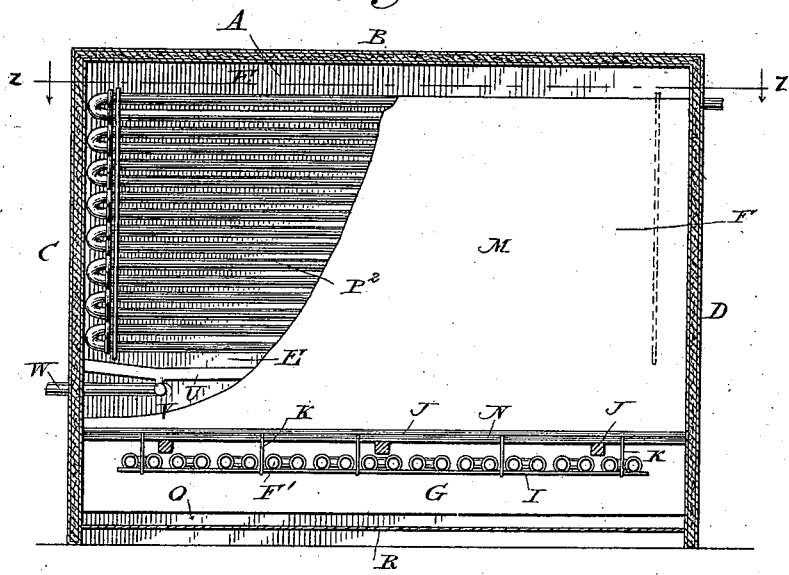
Figure 3:
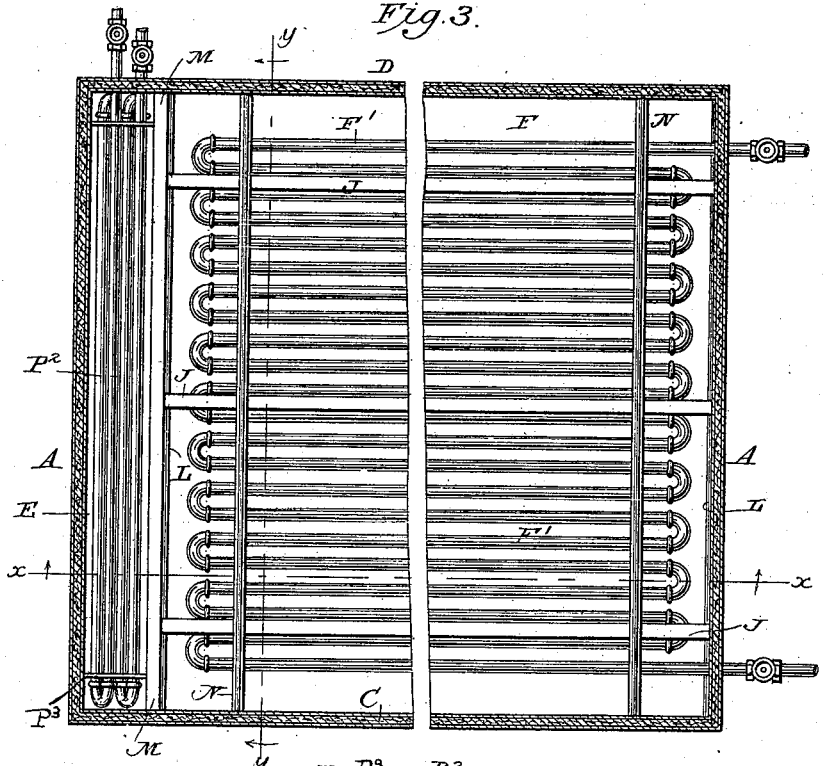
Figure 4:
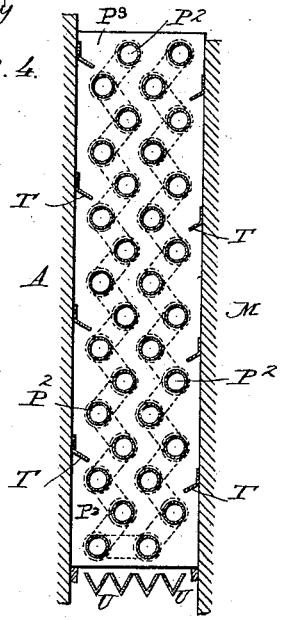

Figure 1 is a sectional view of my kiln on the line X X, Fig. 3. Fig. 2 is a sectional view of my kiln on the line Y Y, Fig. 3, with part of the partition-walls of condensing-chamber cut away, showing the condensing-pipes. Fig. 3 is a sectional plan view of my kiln, cut through the line Z Z, Fig. 2. Fig. 4 is a detail sectional view of the baffle-plates.

In the drawings like letters of reference indicate corresponding parts in each figure.

A and A are the side walls of the kiln, B the top, and C and D the back and front walls, respectively.

E is the condensing-chamber, and F denotes the evaporating-chamber. Under the evaporating-chamber is placed the distributing-chamber G. In the upper portion of G a set of steam-pipes F' or other heating apparatus is placed, which is supported on rods I, these rods being hung from cross-ties J by suitable hangers K. The ends of the cross-ties J rest on joists L, secured to the side walls M of the condensing-chamber E and the outside walls A of the kiln, or they may be supported in any suitable manner. Rails N are secured on the ties J. The inner wall of the condensing-chamber does not extend to the ceiling of chamber F or the bottom of chamber G, thus allowing communication between the chamber F and chamber E and from the latter to chamber G through the openings O at the top and bottom of M, the lower opening O being essentially below the level of the heating pipes or apparatus F'.

R is a false floor or diaphragm in the distributing-chamber G and may be suitably secured in the horizontal position to the front and back walls of the chamber G at such a height as to divide the air-current coming out of the lower opening O. Spaces S are left between the outer edge of the diaphragm and the side wall A of the kiln.

In the condensing-chamber E a series of pipes is suitably supported, through which cold water, cold brine, anhydrous ammonia-gas, or any other refrigerant circulates, the number of these pipes being proportional to the size and capacity of the kiln. The support for the pipes preferably consists of two metal plates $P^3$, provided with holes for the passage of the pipes $P^2$, forming the condensing-coil. In the spaces between the pipes baffle-plates T are placed to direct the current of air back and forward among the pipes, so as to bring the air into contact with the greatest possible surface area of chilled pipes, thus condensing all the moisture in the air on the surface of the pipes and enabling it to be caught in the drip-troughs U and carried off from the kiln through pipes V, leading to a main pipe W. These troughs are preferably V-shaped and are placed directly under each vertical row of pipes. A single trough, however, might be used, extending across the condensing-chamber and underneath all the pipes.

The walls and ceiling of all three chambers E, F, and G are insulated with materials that are non-conductors, as should also be the partition M.

In using this kiln the wood, leather, grain, fruit, or other material to be dried is run into the kiln on a truck along the rails N or may be suspended or placed in the kiln by any other means desired. The kiln is then closed up and the steam is allowed to circulate through the pipes F'. The cold water or other refrigerant is also forced through the pipes $P^2$, the flow being regulated by valves.

In the lower portion of the condensing-chamber and beneath the condensing-pipes a deflector Q is provided. This deflector consists of a beveled piece placed at such a curve or angle as to facilitate and direct the flow of the dried air into the distributing-chamber.

The operation of the kiln is as follows: The air surrounding the steam or heating pipes absorbs heat therefrom, expands, and rises heated through the material under treatment in chamber F. The higher the temperature of such air the greater, according to a well-known physical law, is its capacity for absorbing moisture. The heated air rising through the material to be dried takes up the moisture in such material and is constantly pushed upward by the heated air below. The air increases in tension toward the ceiling of F and is forced through the duct O into the condensing-chamber E and over and through the pipes therein containing the refrigerating liquid or gas, the baffle-plate serving to make the contact more complete. The moisture contained in the air is condensed on the cooling-pipes and passes off through dripping troughs and pipes, while the air now freed from its moisture and made more dense under the influence of gravitation, as well as the force of the heated air, falls to the bottom of the condensing-chamber. Thence it passes into the distributing-chamber G through the duct O, partly over and partly under the diaphragm.

In the form of kiln previously referred to the lower duct O was on or above the level of the steam-pipes F'. Consequently as soon as the air left the condensing-chamber through said opening it was forced to rise straight up the side of the heating-chamber by the heat from the pipes, and in this way only the wood or other material near the condensing-chamber came under the influence of the dry air. The air in the center and more remote parts of the evaporating-chamber eddied slowly through the wood or remained stagnant, becoming in either case saturated with moisture, which, owing to the direct upward current next the condensers, was not carried off. The process was thus very imperfect and much slower than if all the air circulated directly throughout all the material in the evaporating-chamber and passed from thence into the condensing-chamber. By my invention I have attained this condition. The dried air coming into the distributing-chamber is dispersed evenly under the pipes. The diaphragm according to its position takes a certain amount of the cool air across to the remote side of the distributing-chamber before allowing it to ascend, thus making the distribution of the air dried in the condensing-chamber still more complete and uniform. This air under the influence of the heating-pipes has its power of absorption once more renewed, expands, and rises to again take up moisture and deposit it in the condensing-chamber. Thus the process goes on continuously. The same body of air is used over and over again. No outside air charged with moisture, as such air always is even when heated, is brought into the kiln. A fixed volume of air and materials containing moisture is continuously having such moisture reduced toward the vanishing-point. No fans or blowers are used or indeed needed. The expansive power of heated air and the force of gravitation are, it will be noticed, used each in conjunction with and assisting the other. The air after being first heated requires but a slight expenditure of energy to keep it at a high temperature, as it does not lose more than 10° or 15° Fahrenheit in the condensing-chamber. The process is therefore economical. The amount of the moisture present is constantly approaching a minimum, and the minimum is quickly reached.

A single condensing-chamber with sufficient cooling-pipes may be used in connection with two evaporating and distributing chambers. In such case the common condensing-chamber is of course placed in the center.

It will be understood that I do not claim the combination of the evaporating-chamber and the condensing-chamber, as this in itself is old.

Having thus described my invention, what I claim is—

1. In a drying-kiln, the combination of an evaporating-chamber closed to the external atmosphere; heating means located near the bottom thereof; a condensing-chamber in communication with the upper and lower portions of said evaporating-chamber; and means for securing a substantially even distribution of the air beneath the heating means, as it passes from the condensing-chamber.

2. In a drying-kiln, the combination of an evaporating-chamber; a series of heating-pipes located near the bottom thereof; a condensing-chamber having an opening communicating with the upper portion of the evaporating-chamber, and a second opening communicating with the space below the heating-pipes; and means for securing a substantially even distribution of the air beneath said pipes as it passes from the condensing-chamber.

3. In a drying-kiln, the combination of an evaporating-chamber; heating-pipes located at a point near the bottom of the same; a condensing-chamber having an opening communicating with the upper portion of the evaporating-chamber; a duct opening from said condensing-chamber to the space beneath the heating-pipes; and a diaphragm located in line with said duct and extending across beneath the heating-pipes.

4. In a drying-kiln, the combination of an evaporating-chamber; a series of heating-pipes located at a point near the bottom of the same; a condensing-chamber having an opening communicating with the upper portion of the evaporating-chamber; a series of refrigerating-pipes mounted in said chamber; baffle-plates also mounted in said chamber, arranged to cause the air to circulate around and about said pipes; a duct opening from the lower end of said condensing-chamber into the space beneath the heating-pipes; and a diaphragm in line with said duct, said diaphragm extending across and beneath the heating-pipes, substantially as described.

5. In a drying-kiln, the combination of an evaporating-chamber; heating-pipes located at a point near the bottom of the same; a condensing-chamber having an opening communicating with the upper portion of the evaporating-chamber; a duct opening from said condensing-chamber into the space beneath the heating-pipes; means for securing a substantially even distribution of the air beneath said pipes as it passes from the condensing-chamber; means for causing a circulation of the air in said condensing-chamber about and around the pipes therein; and means for withdrawing the moisture from said chamber, substantially as described.

6. In a drying-kiln, the combination of an evaporating-chamber; a series of heating-pipes located at a point near the bottom of the same; a condensing-chamber having an opening communicating with the upper portion of said evaporating-chamber; a series of refrigerating-pipes mounted in said condensing-chamber; means for causing circulation of the air passing through said chamber in and about the pipes; means for withdrawing the condensed liquid from said chamber; a duct opening from the lower end of the chamber into the space beneath the heating-pipes; and a diaphragm mounted in the space beneath the heating-pipes, said diaphragm serving to cause a substantially even distribution of the air about and around the heating-pipes, substantially as described.

7. In a drying-kiln, the combination of an evaporating-chamber; heating-pipes located at a point near the bottom of the same; a condensing-chamber having an opening communicating with the upper portion of the evaporating-chamber; a duct opening from said condensing-chamber to the space beneath the heating-pipes; a diaphragm located in line with said duct and extending across beneath the heating-pipes, said diaphragm being of such dimension as to form an opening at each end thereof, substantially as described.

8. In a drying-kiln, the combination of an evaporating-chamber; a series of heating-pipes located near the bottom thereof; a condensing-chamber having an opening communicating with the upper portion of the evaporating-chamber; plates $P^3$ secured in said chamber; refrigerating-pipes passing through the openings in said plates; a duct opening from the lower end of said condensing-chamber to the space beneath the heating-pipes; and means for securing a substantially even distribution of the air beneath the heating-pipes as it passes from the condensing-chamber.

9. In a drying-kiln, the combination of an evaporating-chamber closed to the external atmosphere; a condensing-chamber in communication with the upper portion of said evaporating-chamber; a distributing-chamber located beneath the evaporating-chamber and communicating therewith and with the lower end of the condensing-chamber; a series of heating-pipes located in the upper portion of the distributing-chamber; and means for securing an even distribution of the air beneath the heating-pipes as it passes into the distributing-chamber from the condensing-chamber.

10. In a drying-kiln, the combination of an evaporating-chamber closed to the external atmosphere; a condensing-chamber in communication with the upper portion of said evaporating-chamber; a distributing-chamber located beneath the evaporating-chamber and communicating therewith and with the lower end of the condensing-chamber; a series of heating-pipes located in the upper portion of the distributing-chamber; and a diaphragm mounted in the distributing-chamber beneath the heating-pipes.

11. In a drying-kiln, the combination of an evaporating-chamber closed to the external atmosphere; a condensing-chamber in communication with the upper portion thereof; vertically-disposed plates mounted in said condensing-chamber; horizontally-arranged pipes extending through said plates, said pipes being arranged in vertical columns or tiers, the pipes of one tier lying in a different horizontal plane from those of the adjacent tier; a distributing-chamber below the evaporating-chamber and communicating with the lower end of the condensing-chamber; and a series of heating-pipes located in the upper portion of the distributing-chamber.

In testimony whereof I have signed my name to this specification in the presence of two subscribing witnesses.

JOSEPH FRANCIS HANRAHAN.

Witnesses:
MARGARET MCKAIN,
E. J. DALY.